US011422787B2

(12) United States Patent
Park et al.

(10) Patent No.: US 11,422,787 B2
(45) **Date of Patent: *Aug. 23, 2022**

(54) METHOD AND DEVICE FOR WIRELESSLY UPDATING SOFTWARE FOR VEHICLE

(71) Applicants: Hyundai Motor Company, Seoul (KR); Kia Motors Corporation, Seoul (KR)

(72) Inventors: Seung Wook Park, Seoul (KR); Jae Jun Ha, Gyeonggi-do (KR); In Yong Jung, Gyeonggi-do (KR); A Ram Cho, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 85 days.

This patent is subject to a terminal disclaimer.

(21) Appl. No.: 16/943,061

(22) Filed: Jul. 30, 2020

(65) Prior Publication Data

US 2020/0356356 A1 Nov. 12, 2020

Related U.S. Application Data

(63) Continuation of application No. 16/048,692, filed on Jul. 30, 2018, now Pat. No. 10,768,922, which is a (Continued)

(30) Foreign Application Priority Data

Feb. 10, 2017 (KR) ........................ 10-2017-0018667

(51) Int. Cl.
*G06F 8/65* (2018.01)
*H04W 4/44* (2018.01)
(Continued)

(52) U.S. Cl.
CPC ................ *G06F 8/65* (2013.01); *H04L 67/34* (2013.01); *H04W 4/44* (2018.02); *H04L 67/02* (2013.01)

(58) Field of Classification Search
CPC .......... H04W 4/44; H04L 67/34; H04L 67/02; G06F 8/60–70
See application file for complete search history.

(56) References Cited

U.S. PATENT DOCUMENTS 6,161,071 A 12/2000 Shuman et al.
9,214,085 B2 12/2015 Ichihara
(Continued)

FOREIGN PATENT DOCUMENTS

CN 102736925 A 10/2012
CN 104777771 A 7/2015
(Continued)

OTHER PUBLICATIONS

Supplementary European Search Report corresponding to European Patent Application No. 17750479.2 dated Aug. 28, 2019, 9 pages.

*Primary Examiner* — Ziaul A Chowdhury
(74) *Attorney, Agent, or Firm* — Fox Rothschild LLP

(57) ABSTRACT

The present invention relates to a method and a device for wirelessly updating software for a vehicle and, more specifically, to a method and a device for wirelessly updating software of an electronic device for a vehicle. A method for wirelessly updating software of a gateway for a vehicle, according to one exemplary embodiment of the present invention, comprises the steps of: receiving a first message including a software module list from at least one controller; and transmitting, to an update server, a second message including a software module list with respect to each of the at least one controller, wherein the first message comprises (Continued)

hardware version information, and the second message comprises region information of the vehicle.

18 Claims, 19 Drawing Sheets

Related U.S. Application Data continuation of application No. PCT/KR2017/001509, filed on Feb. 10, 2017.

(60) Provisional application No. 62/297,422, filed on Feb. 19, 2016, provisional application No. 62/293,842, filed on Feb. 11, 2016.

(51) Int. Cl.
*H04L 67/02* (2022.01)
*H04L 67/00* (2022.01)

(56) References Cited

U.S. PATENT DOCUMENTS

| | | | |
|---|---|---|---|
| 9,980,104 B2 | 5/2018 | Mahiddini et al. | |
| 10,225,350 B2 | 3/2019 | Penilla et al. | |
| 10,768,922 B2 | 9/2020 | Park et al. | |
| 2003/0078701 A1 | 4/2003 | Sunami et al. | |
| 2003/0195925 A1 | 10/2003 | Kaneko et al. | |
| 2008/0181158 A1 | 7/2008 | Bouazizi et al. | |
| 2009/0077266 A1 | 3/2009 | Alrabady et al. | |
| 2009/0077267 A1 | 3/2009 | Alrabady et al. | |
| 2010/0042991 A1 | 2/2010 | Xu et al. | |
| 2011/0153652 A1 | 6/2011 | Yun et al. | |
| 2011/0197187 A1 | 8/2011 | Roh | |
| 2012/0265405 A1 | 10/2012 | Matsumura et al. | |
| 2012/0323402 A1 | 12/2012 | Murakami | |
| 2013/0318541 A1 | 11/2013 | Balasaygun et al. | |
| 2014/0149585 A1* | 5/2014 | Gocek | G06F 16/9566 709/224 |
| 2014/0245278 A1 | 8/2014 | Zellen | |
| 2015/0193219 A1 | 7/2015 | Pandya et al. | |
| 2015/0242198 A1 | 8/2015 | Tobolski et al. | |
| 2015/0331686 A1* | 11/2015 | Petersen | G06F 8/65 701/31.5 |
| 2016/0170775 A1 | 6/2016 | Rockwell et al. | |
| 2016/0197932 A1 | 7/2016 | Hoffman et al. | |
| 2016/0219029 A1 | 7/2016 | Oshida | |
| 2016/0330082 A1 | 11/2016 | Bliss et al. | |
| 2016/0344705 A1* | 11/2016 | Stumpf | H04W 4/40 |
| 2016/0360557 A1 | 12/2016 | Lavi et al. | |
| 2017/0034023 A1* | 2/2017 | Nickolov | H04L 43/0817 |
| 2017/0046378 A1 | 2/2017 | Quin et al. | |
| 2017/0060559 A1* | 3/2017 | Ye | H04L 63/061 |
| 2017/0060567 A1 | 3/2017 | Kim et al. | |
| 2017/0078099 A1* | 3/2017 | Lester | H04L 63/0838 |
| 2017/0134164 A1 | 5/2017 | Haga et al. | |
| 2017/0308365 A1* | 10/2017 | Cermak | G06F 8/61 |
| 2017/0315797 A1* | 11/2017 | Vangelov | H04L 67/12 |
| 2018/0107473 A1 | 4/2018 | Ahmed et al. | |
| 2018/0300472 A1 | 10/2018 | Nakamura et al. | |
| 2019/0315293 A1 | 10/2019 | Arai | |

FOREIGN PATENT DOCUMENTS

| | | | |
|---|---|---|---|
| CN | 104866336 | A | 8/2015 |
| CN | 105094882 | A | 11/2015 |
| JP | 2012-101788 | A | 5/2012 |
| KR | 10-2015-0043732 | A | 4/2015 |
| KR | 10-2015-0076846 | A | 7/2015 |

* cited by examiner

FIG. 2

| Type | Subtype | From | To | Purpose |
|---|---|---|---|---|
| diagnose | request | VMG | ECU | Request of diagnose of software status |
| | report | ECU | VMG | Result of diagnose including software status |
| | submit | VMG | Usvr | Report of results of ECUs in a vehicle |
| | receipt | Usvr | VMG | Receipt for submit of diagnose report |
| update_check | request | VMG | Usvr | Request of update module |
| | response | Usvr | VMG | Update module provided |
| update | notification | VMG | U/I | Notification message to introduce update for the driver |
| | confirmation | U/I | VMG | Confirmation message from the driver to apply update |
| | application | VMG | ECU | Request message including update module |
| | result | ECU | VMG | Result of application of the update module |
| update_report | submit | VMG | Usvr | Report of application of the update |
| | receipt | Usvr | VMG | Receipt of the report |

```
<Message protocol="1.0" version="1.0.2" type="diagnose" subtype="request"
sessionid="{7316A97D-8C04-428B-B498-0F51087A1093}" messageid="{2E255A59-B875-
4347-90CA-92326BF45BEF}" trustlevel="3">
  <IssuedTime>1903-07-01T00:00:00Z</IssuedTime>
  <ExpirationTime>1903-07-01T00:00:00Z</ExpirationTime>
</message>
```

FIG. 6

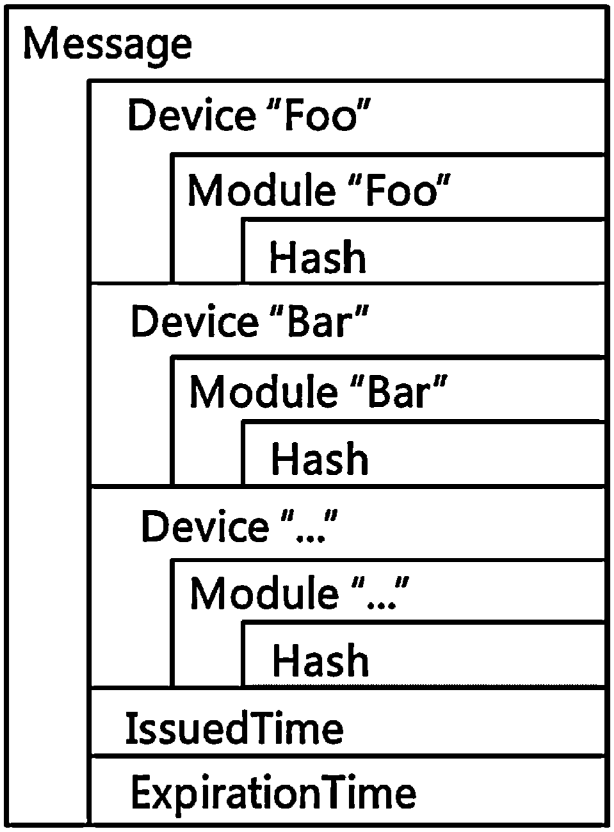

FIG. 7

```
<message protocol="1.0" version="1.0.2" type="diagnose" subtype="response"
sessionid="{7316A97D-8C04-428B-B498-0F51087A1093}" ownerid="ownerid987239487"
messageid="{66E6F81E-F293-4531-B2FC-A93F177373AA}" trustlevel="3">
    <Device name="device1" type="ECU" model="model1" deviceid="did0987234">
        <Module moduleid="{66E6F81E-F293-4531-B2FC-A93F177373AA}"
version="1.3.23.0" nextversion="">
            <Hash algorithm="SHA-256">hash data here</Hash>
        </Module>
    </Device>
  <IssuedTime>1903-07-01T00:00:00Z</IssuedTime>
  <ExpirationTime>1903-07-01T00:00:00Z</ExpirationTime>
</message>
```

FIG. 9

```
<message protocol="1.0" version="1.0.2" type="diagnose" subtype="submit"
sessionid="{7316A97D-8C04-428B-B498-0F51087A1093}" ownerid="oid987239487"
messageid="{BBCE3B0B-2A10-443A-97D0-EF4650457422}" trustlevel="3">
    <Vehicle name="vehicleName" model="modelName" modelid="mid34987130"
vehicleid="vid0987234"/>
    <Device name="device1" type="ECU" model="model1" id="did0987234">
        <Module moduleid="{66E6F81E-F293-4531-B2FC-A93F177373AA }"
version="1.3.23.0" nextversion=""/>
            <Hash algorithm="SHA-256">hash data here</Hash>
        </Module>
        <Module moduleid="{4D168B58-26FA-4157-9703-A431D99C8438}"
version="2.4.34.0" nextversion=""/>
            <Hash algorithm="SHA-256">hash data here</Hash>
        </Module>
    </Device>
    <Device name="device2" type="ECU" model="model1" id="did0987234">
        <Module moduleid="{70628FDC-2282-4B2F-8A36-13445DED587A}"
version="3.5.45.0" nextversion=""/>
            <Hash algorithm="SHA-256">hash data here</Hash>
        </Module>
    </Device>
    <IssuedTime "1903-07-01T00:00:00Z"/>
    <ExpirationTime "1903-07-01T00:00:00Z"/>
</message>
```

FIG. 10

```
<message protocol="1.0" version="1.0.2" type="diagnose"
subtype="receipt" sessionid="{7316A97D-8C04-428B-B498-
0F51087A1093}" ownerid="oid987239487" messageid="{E313159C-2081-
4A10-B61D-4F81D074D54F}" trustlevel="3" status="yes">
    <IssuedTime "1903-07-01T00:00:00Z"/>
    <ExpirationTime "1903-07-01T00:00:00Z"/>
</message>
```

FIG. 12

```
<message protocol="1.0" version="1.0.2" type="update_check" subtype="request"
sessionid="{19622672-A025-4500-B26A-BB626BC61C62}" ownerid="oid987239487"
messageid="{4604A6C9-F72F-452B-ABA5-94168CCD8FD6}" trustlevel="3">
    <Vehicle name="vehicleName" model="modelName" modelid="mid34987130"
vehicleid="vid0987234"/>
    <Device name="device1" type="ECU" model="model1" id="did0987234">
        <Module moduleid="{1F6EDD6C-17D4-461B-8403-1E240E26464E}"
version="1.3.23.0" nextversion=""/>
        <Module moduleid="{4D168B58-26FA-4157-9703-A431D99C8438}"
version="2.4.34.0" nextversion=""/>
    </Device>
    <Device name="device2" type="ECU" model="model1" id="did0987234">
        <Module moduleid="{70628FDC-2282-4B2F-8A36-13445DED587A}"
version="3.5.45.0" nextversion=""/>
    </Device>
    <IssuedTime "1903-07-01T00:00:00Z"/>
    <ExpirationTime "1903-07-01T00:00:00Z"/>
</message>
```

FIG. 14

```
<message protocol="1.0" version="1.0.2" type="update_check" subtype="response
" sessionid="{19622672-A025-4500-B26A-BB626BC61C62}" ownerid="oid987239487"
messageid="{4604A6C9-F72F-452B-ABA5-94168CCD8FD6}" trustlevel="3">
    <Vehicle name="vehicleName" model="modelName" modelid="mid34987130"
vehicleid="vid0987234"/>
    <Device name="device1" type="ECU" model="model1" id="did0987234">
        <Module moduleid="{1F6EDD6C-17D4-461B-8403-1E240E26464E}"
version="1.3.23.0" nextversion="" status="ok">
            <Urls>
                <Url codebase="http://update.server/this/is/an/example/url/"/>
            </Urls>
            <Manifest version="1.4.0">
                <Packages>
                    <Package name="module1.bin" size="589">
                        <Hash algorithm="SHA-256">hash data here</Hash>
                    </Package>
                </Packages>
                <Actions>
                    <Action arguments="--argument-for-installation"
event="install"/>
                </Actions>
            </Manifest>
        </Module>
        <Module moduleid="{4D168B58-26FA-4157-9703-A431D99C8438}"
version="2.4.34.0" nextversion="" status="noupdate">
        </Module>
    </Device>
    <Device name="device2" type="ECU" model="model1" id="did0987234">
        <Module moduleid="{70628FDC-2282-4B2F-8A36-13445DED587A}"
version="3.5.45.0" nextversion="" status="noupdate">
        </Module>
    </Device>
    <IssuedTime "1903-07-01T00:00:00Z"/>
    <ExpirationTime "1903-07-01T00:00:00Z"/>
</message>
```

FIG. 15

```
<message protocol="1.0" version="1.0.2" type="update_check" subtype="response " sessionid="{19622672-A025-4500-B
26A-BB626BC61C62}" ownerid="oid987239487" messageid="{4604A6C9-F72F-452B-ABA5-94168CCD8FD6}" trustlevel="3">
    <Vehicle name="vehicleName" model="modelName" modelid="mid34987130" vehicleid="vid0987234"/>
    <Device name="device1" type="ECU" model="model1" id="did0987234">
        <Module moduleid="{1F6EDD6C-17D4-461B-8403-1E240E26464E}" version="1.3.23.0" nextversion="" status="ok">
            <Urls>
               <Url codebase="http://update.server/this/is/an/example/url/"/>
               <Url codebase="http://update2.server/this/is/an/example/url/"/>
            </Urls>
            <Manifest version="1.4.0">
                ...
```

FIG. 16

```
<message protocol="1.0" version="1.0.2" type="update_check" subtype="response " sessionid="{19622672-A025-4500-B
26A-BB626BC61C62}" ownerid="oid987239487" messageid="{4604A6C9-F72F-452B-ABA5-94168CCD8FD6}" trustlevel="3">
    <Vehicle name="vehicleName" model="modelName" modelid="mid34987130" vehicleid="vid0987234"/>
    <Device name="device1" type="ECU" model="model1" id="did0987234">
        <Module moduleid="{1F6EDD6C-17D4-461B-8403-1E240E26464E}" version="1.3.23.0" nextversion="" status="ok">
           <Urls>
             <Url codebase="http://update.server/this/is/an/example/url/"
                  codebase2="http://update2.server/this/is/an/example/url/" />
           </Urls>
           <Manifest version="1.4.0">
           ...
```

FIG. 17

```
<message protocol="1.0" version="1.0.2" type="update" subtype="notification" sessionid="{BC5E12A1-3A6A-49F9-A3CA
-230740B745DE}" ownerid="oid987239487" messageid="{C7BF700E-D179-4849-92F5-37ECD87740A0}" trustlevel="3">
    <Device name="device1" type="ECU" model="model1" id="did0987234">
        <Module moduleid="{1F6EDD6C-17D4-461B-8403-1E240E26464E}" version="1.3.23.0" nextversion="" status="ok">
            <Urls>
                <Url codebase="http://itu-t.int/this/is/an/example/url/"/>
            </Urls>
            <Manifest version="1.4.0">
                <Packages>
                    <Package name="module1.bin" size="589"
                         description="This update S/W provides an performance enhancement of engine …">
                        <Hash algorithm="SHA-256">hash data here</Hash>
                    </Package>
                </Packages>
…..
```

FIG. 18

```
<message protocol="1.0" version="1.0.2" type="update" subtype="notification" sessionid="{BC5E12A1-3A6A-49F9-A3CA
-230740B745DE}" ownerid="oid987239487" messageid="{C7BF700E-D179-4849-92F5-37ECD87740A0}" trustlevel="3">
    <Device name="device1" type="ECU" model="model1" id="did0987234">
        <Module moduleid="{1F6EDD6C-17D4-461B-8403-1E240E26464E}" version="1.3.23.0" nextversion="" status="ok">
            <Urls>
                <Url codebase="http://itu-t.int/this/is/an/example/url/"/>
            </Urls>
            <Manifest version="1.4.0">
                <Packages>
                    <Package name="module1.bin" size="589"
                         descriptionurl="http://itu-t.int/ex/descript/">
                        <Hash algorithm="SHA-256">hash data here</Hash>
                    </Package>
                </Packages>
…..
```

FIG. 19

```
<message protocol="1.0" version="1.0.2" type="update" subtype="confirmation"
sessionid="{BC5E12A1-3A6A-49F9-A3CA-230740B745DE}" ownerid="oid987239487"
messageid="{939C1A21-FA3C-4080-9006-09094B85E698}" trustlevel="3" status="ok">
    <IssuedTime "1903-07-01T00:00:00Z"/>
    <ExpirationTime "1903-07-01T00:00:00Z"/>
</message>
```

FIG. 21

```
<message protocol="1.0" version="1.0.2" type="update" subtype="application"
sessionid="{BC5E12A1-3A6A-49F9-A3CA-230740B745DE}" ownerid="oid987239487"
messageid="{EBB65A6F-F963-4EBD-A1DA-DEFA9997AE6A}" trustlevel="3">
    <Device name="device1" type="ECU" model="model1" id="did0987234">
        <Module moduleid="{1F6EDD6C-17D4-461B-8403-1E240E26464E}"
version="1.3.23.0" nextversion="" status="ok">
            <Manifest version="1.4.0">
                <Packages>
                    <Package name="module1.bin" size="589">
                        <Target
encode="base64Binary">Vm0wd2QyUXlVWGxWV0d4V1YwZDRWMVl3WkRSV01WbDNXa1JTVjAxV2JET1
hhMUpUVjBaS2RHVkdXbFpOYWtFeFZtcEJlRll5U2tWVWJHaG9UV3N3ZUZadGNFZFpWMDE1VTJOV1ZXSk
hhRzlVVjNOM1pVWmtWMXBFVWxSTmF6RTBWMnRvUjFWdFNrZFhiR2hhWVRKb1JGWldXbUZqVmtaMFVteH
dWMDF...</Target>
                        <Hash algorithm="SHA-256">hash data here</Hash>
                    </Package>
                </Packages>
                <Actions>
                    <Action arguments="--argument-for-installation"
event="install"/>
                </Actions>
            </Manifest>
        </Module>
    </Device>
    <IssuedTime "1903-07-01T00:00:00Z"/>
    <ExpirationTime "1903-07-01T00:00:00Z"/>
</message>
```

FIG. 22

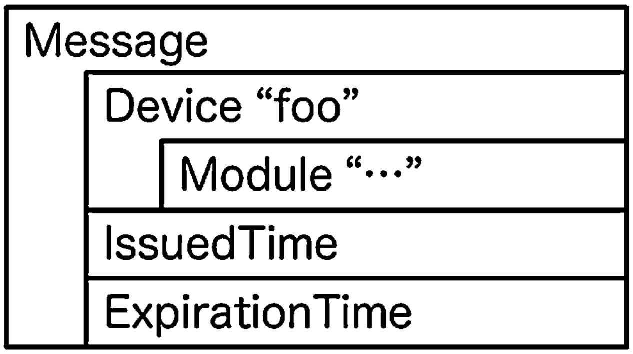

FIG. 23

```
<message protocol="1.0" version="1.0.2" type="update"
subtype="report" sessionid="{BC5E12A1-3A6A-49F9-A3CA-230740B745DE}"
ownerid="oid987239487" messageid="{EBB65A6F-F963-4EBD-A1DA-DEFA9997AE6A}"
trustlevel="3">
    <Device name="device1" type="ECU" model="model1" id="did0987234">
        <Module moduleid="{1F6EDD6C-17D4-461B-8403-1E240E26464E}"
version="1.4.0" nextversion="" status="ok">
        </Module>
    </Device>
    <IssuedTime "1903-07-01T00:00:00Z"/>
    <ExpirationTime "1903-07-01T00:00:00Z"/>
</message>
```

FIG. 24

```
<message protocol="1.0" version="1.0.2" type="update_report" subtype="submit"
sessionid="{9AFFEB5A-F36B-4E05-819F-5BDCD3A0E3EC}" ownerid="oid987239487"
messageid="{3F7A6438-8306-447E-A1BB-99CED4C2B6AD}" trustlevel="3">
    <Vehicle name="vehicleName" modelid="mid34987130" type="ECU"
model="modelName" vid="vid0987234"/>
    <Device name="device1" type="ECU" model="model1" id="did0987234">
        <Module moduleid="{1F6EDD6C-17D4-461B-8403-1E240E26464E}"
version="1.4.0" nextversion="" status="ok">
            <Hash algorithm="SHA-256">hash data here</ModuleHash>
        </Module>
        <Module moduleid="{4D168B58-26FA-4157-9703-A431D99C8438}"
version="2.4.34.0" nextversion="" status="ok">
            <Hash algorithm="SHA-256">hash data here</ModuleHash>
        </Module>
    </Device>
    <Device name="device1" type="ECU" model="model1" id="did0987234">
        <Module moduleid="{70628FDC-2282-4B2F-8A36-13445DED587A}"
version="3.5.45.0" nextversion="" status="ok">
            <Hash algorithm="SHA-256">hash data here</ModuleHash>
        </Module>
    </Device>
    <IssuedTime "1903-07-01T00:00:00Z"/>
    <ExpirationTime "1903-07-01T00:00:00Z"/>
</message>
```

FIG. 25

```
<message protocol="1.0" version="1.0.2" type="update_report" subtype="receipt"
sessionid="{9AFFEB5A-F36B-4E05-819F-5BDCD3A0E3EC}" ownerid="oid987239487"
messageid="{B5585708-6BDA-4B07-B2CB-5E9241F63271}" trustlevel="3">
    <Vehicle name="vehicleName" model="modelName" modelid="mid34987130"
vehicleid="vid0987234"/>
    <Device name="device1" type="ECU" model="model1" id="did0987234">
        <Module moduleid="{1F6EDD6C-17D4-461B-8403-1E240E26464E}"
version="1.4.0" nextversion="" status="ok"/>
        <Module moduleid="{4D168B58-26FA-4157-9703-A431D99C8438}"
version="2.4.34.0" nextversion="" status="ok"/>
    </Device>
    <Device name="device1" type="ECU" model="model1" id="did0987234">
        <Module moduleid="{70628FDC-2282-4B2F-8A36-13445DED587A}"
version="3.5.45.0" nextversion="" status="ok"/>
        </Module>
    </Device>
    <IssuedTime "1903-07-01T00:00:00Z"/>
    <ExpirationTime "1903-07-01T00:00:00Z"/>
</message>
```

METHOD AND DEVICE FOR WIRELESSLY UPDATING SOFTWARE FOR VEHICLE

CROSS-REFERENCES TO RELATED APPLICATIONS

The present application is a continuation application of U.S. application Ser. No. 16/048,692, filed Jul. 30, 2018, which is a continuation application of International Application No. PCT/KR2017/001509, filed on Feb. 10, 2017, which claims priority to U.S. Application No. 62/293,842 filed on Feb. 11, 2016, U.S. Application No. 62/297,422 filed on Feb. 19, 2016, and Korean Application No. 10-2017-0018667 filed on Feb. 10, 2017. The disclosures of the above-listed applications are incorporated by reference herein in their entirety.

TECHNICAL FIELD

The present invention relates to a method and apparatus for updating software in a vehicle and, more particularly, to a method and apparatus for efficiently updating software of an electronic device in a vehicle in a wireless manner.

BACKGROUND ART

As an intelligent transportation system (ITS) has been developed and a percentage of vehicles capable of performing wireless communication (e.g., Wi-Fi, 3G, and LTE) has increased, communication between a vehicle and external entities, such as vehicle-to-vehicle communication or vehicle-to-infrastructure communication, has become common.

Moreover, the number of electronic control units (ECUs) mounted in a vehicle has increased. Since the structures and functions of such ECUs are becoming more sophisticated, software modules inside these ECUs need to be updated for the purpose of bug fixing, performance enhancement, and security improvement.

Generally, the software modules inside the ECUs are updated using diagnostic communication via wired connection between a vehicle and a diagnostic device. However, the speed of diagnostic communication is slow and users are inconvenienced in that they should visit a place such as a service center where the diagnostic device is installed when update is needed.

SUMMARY

The present invention is to provide a method and apparatus for efficiently updating software of an ECU in a vehicle in a wireless manner.

Particularly, the present invention provides a procedure for wirelessly updating software and a message format capable of being used in the procedure.

The technical objects that can be achieved through the present invention are not limited to what has been particularly described hereinabove and other technical objects not described herein will be more clearly understood by persons skilled in the art from the following detailed description.

According to an aspect of the present invention, provided herein is a method of wirelessly updating software in an in-vehicle gateway, the method including receiving a first message including a software module list from at least one controller; and transmitting, to an update server, a second message including a software module list for each of the at least one controller, wherein the first message includes hardware version information, and the second message includes locale information of the vehicle.

In another aspect of the present invention, provided herein is an in-vehicle gateway for wirelessly updating software, the in-vehicle gateway including a wired communication module configured to communicate with at least one controller; a wireless communication module configured to communicate with an update server; and a processor configured to perform control for receiving a first message including a software module list from at least one controller and transmit, to an update server, a second message including a software module list for each of the at least one controller, wherein the first message includes hardware version information, and the second message includes locale information of the vehicle.

In another aspect of the present invention, provided herein is a vehicle for wirelessly updating software, the vehicle including at least one controller; and a gateway configured to receive a first message including a software module list from the at least one controller and transmit, to an update server, a second message including a software module list for each of the at least one controller, wherein the first message includes hardware version information, and the second message includes locale information of the vehicle.

According to at least one embodiment of the present invention constructed as described above, software update of an ECU in a vehicle can be efficiently performed in a wireless manner.

In addition, a procedure for wirelessly updating software and a message format used in each step of the procedure may be defined. Particularly, since hardware version information of a software module and locale information of a vehicle are included in a related message, more accurate update can be performed.

Effects according to the present invention are not limited to what has been particularly described hereinabove and other advantages not described herein will be more clearly understood by persons skilled in the art from the following detailed description of the present invention.

BRIEF DESCRIPTION OF THE DRAWINGS

FIG. 2 is a table illustrating exemplary sessions and exemplary messages based on the sessions according to an embodiment of the present invention.

FIG. 6 illustrates an exemplary structure of a diagnose report message.

FIG. 7 illustrates exemplary coding of the diagnose report message according to an embodiment of the present invention.

FIG. 9 illustrates exemplary coding of the diagnose submit message according to an embodiment of the present invention.

FIG. 10 illustrates exemplary coding of a diagnose receipt message according to an embodiment of the present invention.

FIG. 12 illustrates exemplary coding of the update check request message according to an embodiment of the present invention.

FIG. 14 illustrates exemplary coding of the update check response message according to an embodiment of the present invention.

FIG. 15 illustrates exemplary coding of the update check response message that provides a backup address through a codebase field according to an embodiment of the present invention.

FIG. 16 illustrates exemplary coding of the update check response message that provides a backup address through a codebase2 field according to an embodiment of the present invention.

FIG. 17 illustrates exemplary coding of an update notification message according to an embodiment of the present invention.

FIG. 18 illustrates another exemplary coding of the update notification message according to an embodiment of the present invention.

FIG. 19 illustrates exemplary coding of an update confirmation message according to an embodiment of the present invention.

FIG. 21 illustrates exemplary coding of the update application message according to an embodiment of the present invention.

FIG. 22 illustrates an exemplary structure of an update result message according to an embodiment of the present invention.

FIG. 23 illustrates exemplary coding of the update result message according to an embodiment of the present invention.

FIG. 24 illustrates exemplary coding of an update report submit message according to an embodiment of the present invention.

FIG. 25 illustrates exemplary coding of an update report receipt message according to an embodiment of the present invention.

DETAILED DESCRIPTION

Figure 1:
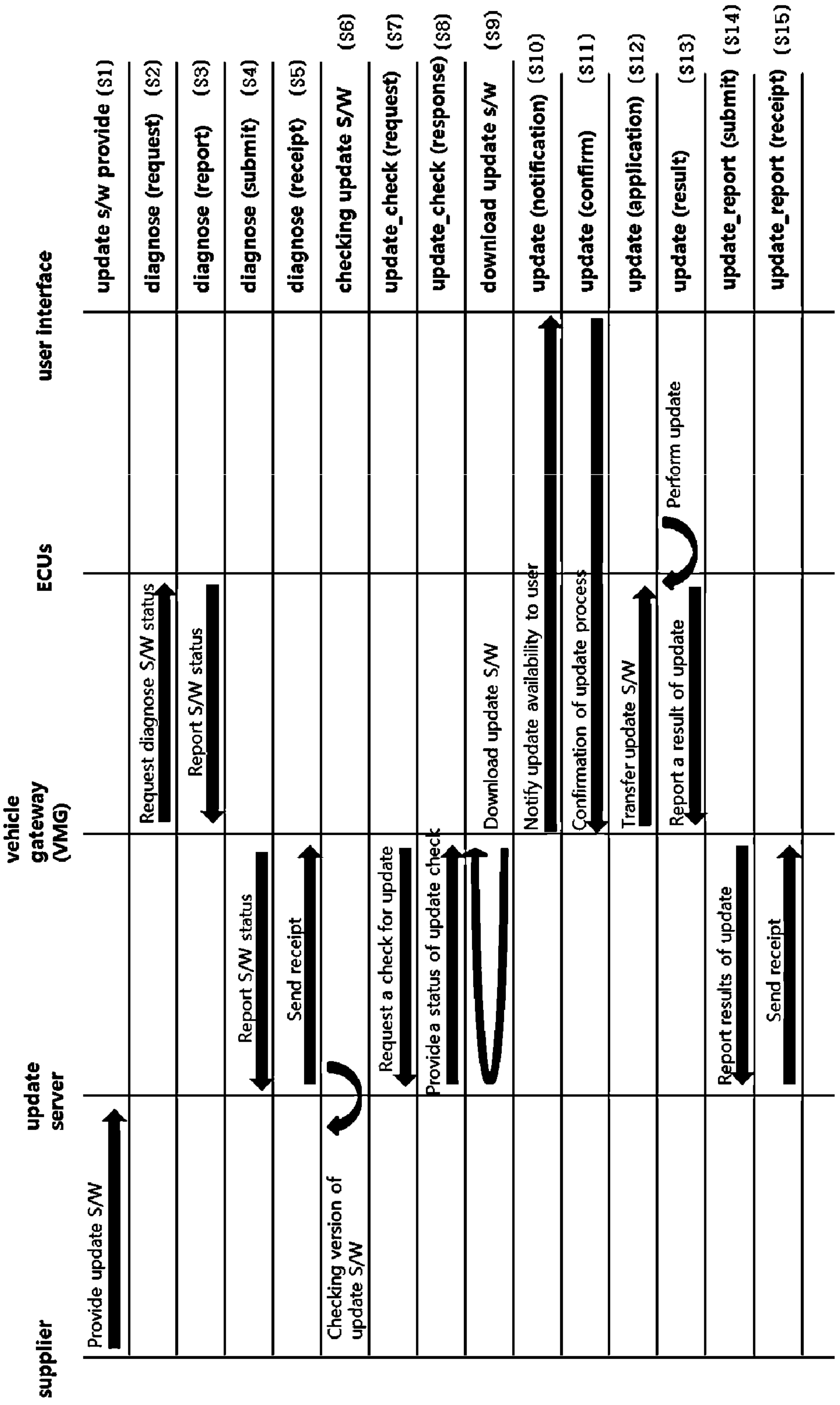
FIG. 1 is a flowchart illustrating an exemplary procedure for wirelessly updating software according to an embodiment of the present invention.

Reference will now be made in detail to the exemplary embodiments of the present invention, examples of which are illustrated in the accompanying drawings. The present invention may, however, be embodied in many different forms and should not be construed as limited to the embodiments set forth herein. In order to clearly illustrate the present invention in the drawings, parts not related to the description are omitted, and like parts are denoted by same reference numerals throughout the specification.

Throughout the specification, when a part is referred to as “comprising/including” an element, it means that the part may include other elements as well, unless specifically stated otherwise. In addition, parts denoted by the same reference numerals throughout the specification denote the same components.

FIG. 1 is a flowchart illustrating an exemplary procedure for wirelessly updating software according to an embodiment of the present invention.

Referring to FIG. 1, a software supplier may provide update software (update module) to an update server (S1). Herein, an operation entity of the software supplier and the update server may be a manufacturer of a vehicle or may be a manufacturer of devices mounted in the vehicle or a manufacturer of components included in the devices mounted in the vehicle. However, the present invention is not limited to such an operation entity of the supplier or the server. Moreover, this step may be asynchronously performed with subsequent steps described below.

A vehicle mobile gateway (VMG) may transmit a diagnose request (diagnose (request)) message to each ECU connected thereto to request the ECU to submit a software list (S2).

In response to the diagnosis (request) message, each ECU may diagnose a software status, generate a list of software modules, and report the list to the VMG through a diagnose report (diagnose (report)) message (S3).

Then, the VMG may submit the list acquired from each ECU through a diagnose submit (diagnose (submit)) message to a corresponding vehicle to check whether a software update is available for the vehicle (S4).

The update server may transmit a diagnose receipt (diagnose (receipt)) message to the VMG in confirmation of a receipt of the list submitted by the VMG (S5).

According to the list, the update server may inspect the status of software installed in the vehicle and determine necessary updates for ECUs (S6).

Since it may take a long time to inspect the status of software, the VMG may transmit an update check request (update_check (request)) message to the update server to periodically check necessity of updates for the vehicle (S7).

If any update is available, the update server may transmit an update check response (update_check (response)) message that includes download location information of the update module to the VMG (S8).

If any update is available, the VMG may download the update module by accessing the download location information (S9).

Prior to applying updates to each ECU, the VMG may notify a driver of the vehicle of confirmation of application of the updates through a user interface (S10). To this end, an update notification (update (notification)) message may be used.

If the driver confirms and accepts application of the updates, an update confirmation (update (confirmation)) message may be transmitted to the VMG (S11).

According to acceptance of application of the updates by the driver, the VMG may transmit an update module file to a corresponding ECU and request that the ECU apply the updates (S12). To this end, an update application (update (application)) message may be used.

Upon receiving the update module file, the ECU may apply the updates and transmit a result of application of the updates to the VMG (S13). To this end, an update result (update (result)) message may be used.

The VMG may submit the result of application of the updates to the update server through an update report submit (update_report (submit)) message (S14).

In response to the update report submit message, the update server may transmit an update report receipt (update_report (receipt)) message to the VMG (S15). If application of the updates fails or remaining updates are found, the update server may repeat steps S6 to S14 until application of the updates is successful.

Among the above-described steps, steps S2 to S5, S7 and S8, and S10 to S15 may be performed through exchange of messages of specific formats and may be divided into a total of four sessions. This is summarized in a table of FIG. 2.

FIG. 2 is a table illustrating exemplary sessions and exemplary messages based on the sessions according to an embodiment of the present invention.

Referring to FIG. 2, messages used in an update process according to this exemplary embodiment may be categorized into a type corresponding to a session and a subtype.

More specifically, a session according to this exemplary embodiment may be divided into diagnose, update_check, update, and update_report. One session may be formed through exchange of two or more messages having different subtypes. Messages corresponding to one session may use an identical value in session ID (sessionid) fields which will be described later.

In FIG. 2, Usvr and U/I denoted as transmission and reception entities of messages represent an update server and a user interface, respectively. A transmitting end/receiving end and purpose of each message have been described earlier and a repeated part will be omitted for clarity of the specification.

Meanwhile, messages exchanged between entities in each step may be protected through a digital signature or message authentication code (MAC) method. In addition to such a method, ID/password authentication, biometric authentication (signature dynamics, iris scan, fingerprint recognition, voice recognition, face recognition, etc.), and out-of-band verification methods may be applied.

Prior to a detailed description of each step, an integrity checking procedure when file transmission of each entity is performed will be described with reference to FIG. 3.

Figure 3:
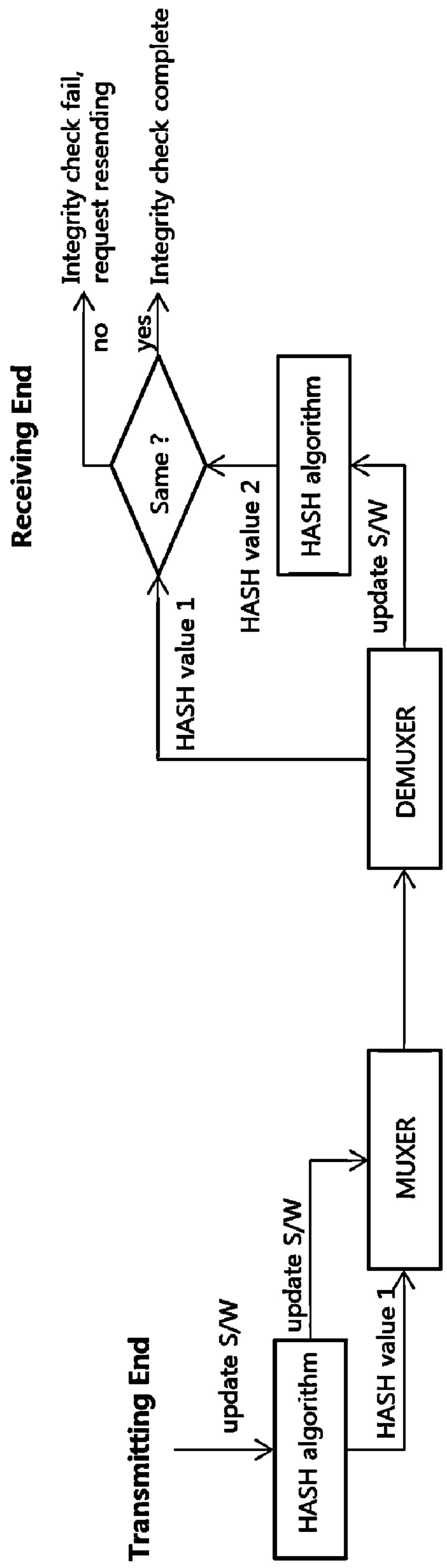
FIG. 3 illustrates an exemplary transmission process of update software according to an embodiment of the present invention.

FIG. 3 illustrates an exemplary transmission process of update software according to an embodiment of the present invention.

The process illustrated in FIG. 3 may prevent software file corruption caused by accidental or intentional attack in a process of transmitting update software and may use an integrity checking method such as md5. In terms of a transmitting end and a receiving end in the process of transmitting update software, if the transmitting end is a supplier, then the receiving end may be a server and, if the transmitting end is an update server, then the receiving end may be a VMG.

Specifically, the transmitting end may generate a first hash value by applying a predetermined hash algorithm operation to update software, multiplex the first hash value with the update software, and transmit the multiplexed result to the receiving end. The receiving end may demultiplex a file transmitted by the transmitting end to restore the first hash value and the update software. Next, the transmitting end may generate a second hash value by applying a predetermined hash algorithm to the update software restored by the receiving end and compares the second hash value with the first hash value. As a result of comparison, if the two values are equal, the receiving end may determine that a corresponding update software file satisfies integrity check and, if not, the receiving end may determine that the corresponding update software file fails to satisfy integrity check and may request that the transmitting end retransmit the file.

Messages described below may include a plurality of elements, for example, a vehicle element and a module element. The vehicle element may include a plurality of fields (or attributes) for defining information about a vehicle. The module element may include a plurality of fields for defining information about each of software modules included in one or more devices of the vehicle.

First, a configuration of the module element will now be described. The module element may include at least one of a module ID (moduleid) field, a version field, or a next version (nextversion) field.

The moduleid field may indicate a unique ID of a module provided by a vehicle manufacturer or a module supplier. The version field may indicate version information of a corresponding software module. The nextversion field may indicate version information of a module in which update is performed and may be mainly used to transmit a response message while the update is performed.

However, to accurately determine whether a specific module is updated, version information of hardware including the software module as well as the version information of the software module may be required. Accordingly, the present exemplary embodiment may include a hardware version (hwversion) field indicating the version information of hardware in the module element.

An example of the configuration of the module element is shown below in Table 1.

TABLE 1

| | | |
|---|---|---|
| Module | — | Container of module information, which contains a Hash element. |
| | moduleid | Module id is a unique id provided by a car manufacture/a supplier. |
| | version | Version of this software module. |
| | hwversion | Version of H/W including this software module |
| | nextversion | The version of the module update in progress, which is mainly used for sending response message during an update. |

According to an exemplary embodiment, the hwversion field may be included in a device element which will be described later. In this case, this field may correspond to a version of this hardware module.

Next, the vehicle element may include at least one of a name field, a model field, a model ID (modelid) field, or a vehicle ID (vehicleid) field. The name field, the model field, the modelid field, and the vehicleid field may indicate the name of a vehicle, a type name of the vehicle which is provided by a vehicle manufacturer, a model name of the vehicle, and an ID of the vehicle which is defined by the vehicle manufacturer, respectively.

However, vehicles of the same type may have different configurations in hardware or software modules based on a region (especially, manufactured region). Accordingly, to accurately specify whether an update is performed, the present exemplary embodiment may include, in the vehicle element, a locale field indicating region information of the vehicle.

An example of the configuration of the vehicle element is shown below in Table 2.

TABLE 2

| | | |
|---|---|---|
| Vehicle | — | Container of vehicle information. It contains multiple Module elements. |
| | name | Name of the vehicle, if any. |
| | model | Type name of the vehicle provided by the car manufacture. |
| | modelid | Model name of the vehicle |
| | vehicleid | Vehicle id defined by a car manufacture. |
| | locale | Locale information of the vehicle |

Hereinafter, each of the above-described steps, and the structure, contents, and coding format of a message used in each step will be described in more detail.

S2: Diagnose (Request)

As the first step of the update procedure, a VMG may request that ECUs submit software lists of the ECUs. To this end, the diagnose (request) message may be used.

Figures 4, 5:
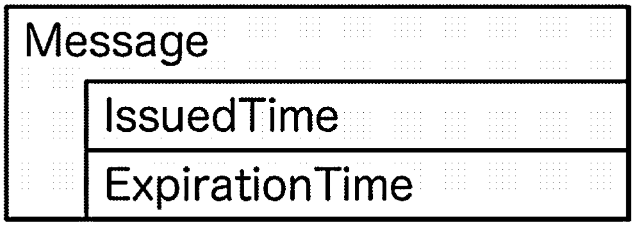
FIG. 4 illustrates an exemplary structure of a diagnose request message according to an embodiment of the present invention.
FIG. 5 illustrates exemplary coding of the diagnose request message according to an embodiment of the present invention.

The structure of the diagnose (request) message is illustrated in FIG. 4. FIG. 4 illustrates an exemplary structure of the diagnose (request) message according to an embodiment of the present invention.

Referring to FIG. 4, the diagnose (request) message may include a Message element, an issued time (IssuedTime) element, and an expiration time (ExpirationTime) element.

An example of the format of the diagnose (request) message is shown below in Table 3.

TABLE 3

| Element | Attribute in Element | Description |
|---|---|---|
| Message | — | Container of the message |
| | protocol | Always "1.0" |
| | version | The version number of the message sender |
| | type | Message type (always "diagnose") |
| | subtype | Message subtype (always "request") |
| | sessionid | Session ID is a random GUID associated with the diagnose session. An identical session ID is applied to a set of diagnose request, report and submit messages. |
| | trustlevel | Trustlevel is determined based on security capability and safety requirement of device that generated this message. |
| | messageid | Message ID is a random GUID associated with individual message. |
| IssuedTime | — | Time of generation of this message. |
| ExpirationTime | — | Expiration time of this message. |

Referring to Table 3, the Message element may include at least one of a protocol field, a version field, a type field, a subtype field, a session ID (sessionid) field, a trust level (trustlevel) field, or a message ID (messageid) field.

The protocol field may be set to a fixed value (e.g., 1.0). The version field may indicate version information of a message sender. In the diagnose (request) message, the type field may always be set to "diagnose". The subtype field may always be set to "request". The sessionid field may be set to a random globally unique ID (GUID) associated with a diagnose session. An identical value may be applied to a set of diagnose request, report, and submit messages, corresponding to one diagnose session. The trustlevel field may be determined based on security capability and safety requirements of a device that generates this message. The messageid field may be set to a random GUID associated with an individual message.

The Issuedtime element may indicate a time of generation of this message. The ExpirationTime element may indicate an expiration time of this message.

An example of XML coding of this message is illustrated in FIG. 5. FIG. 5 illustrates exemplary coding of the diagnose (request) message according to an embodiment of the present invention.

S3: Diagnose (Report)

In response to the diagnose (request) message, each ECU may check a software status thereof, generate a list of software modules, and report the software module list to the VMG. For this purpose, the diagnose (report) message may be used.

The structure of the diagnose (report) message is illustrated in FIG. 6. FIG. 6 illustrates an exemplary structure of the diagnose (report) message.

Referring to FIG. 6, the diagnose (report) message may include at least one Device element in addition to the above-described Message element, IssuedTime element, and the ExpirationTime element. The Device element may include one or more Module elements each including a Hash element.

An example of the format of the diagnose (report) message is shown below in Table 4.

TABLE 4

| Element | Attribute in Element | Description |
|---|---|---|
| Message | — | Container of the message |
| | protocol | Always "1.0" |
| | version | The version number of the message sender |
| | type | Message type (always "diagnose") |
| | subtype | Message subtype (always "report") |
| | sessionid | Session ID is a random GUID associated with the diagnose session. An identical session ID is applied to a set of diagnose request, report and submit messages. |
| | trustlevel | Trustlevel is determined based on security capability and safety requirement of device that generated this message. |
| | ownerid | Owner ID provided by a car manufacture/supplier. |
| | messageid | Message ID is a random GUID associated with individual message. |
| Device | — | Container of device information. It contains multiple Module elements. |
| | name | Name of the device, if any. |
| | type | Type name of the device, such as "Power management ECU", "Seat belt control ECU", etc. |
| | model | Model name of the device. |
| | deviceid | Device id defined by a car manufacture/supplier. |
| Module | — | Container of module information, which contains a Hash element. |
| | moduleid | Module id is a unique id provided by a car manufacture/a supplier. |
| | version | Version of this software module. |
| | hwversion | Version of H/W including this software module |
| | nextversion | The version of the module update in progress, which is mainly used for sending response message during an update. |
| Hash | — | Hash is a container of a hash value and information of its hash algorithm. |

TABLE 4-continued

| Element | Attribute in Element | Description |
|---|---|---|
| | algorithm | Algorithm of the hash function (e.g., SHA-3, SHA-256, etc.) |
| IssuedTime | — | Time of generation of this message. |
| ExpirationTime | — | Expiration time of this message. |

In the following description including description of Table 4, description of the aforementioned elements and fields will be omitted and it is apparent to those skilled in the art that the omitted description can be supplemented with reference to related tables and drawings.

Referring to Table 4, in the diagnose (report) message, the type field of the Message element may always be set to “diagnose” and the subtype field may always be set to “report”. The Message element may further include an owner ID (ownerid) field indicating an owner ID provided by a vehicle manufacturer or supplier.

The Device element may include at least one of a name field, a type field, a model field, and a device ID (deviceid) field. According to an exemplary embodiment, unlike Table 4, the Device element may further include a hardware version field instead of the Module element. The name field may indicate the name of a device. The type field may indicate a type name of the device, such as “Power management ECU” or “Seat belt control ECU”. The model field may indicate a model name of the device. The deviceid field may indicate ID information of the device defined by the vehicle manufacturer/supplier.

The Hash element may represent information about a hash value of each module and a Hash algorithm used for each module.

An example of XML coding of the diagnose (report) message is illustrated in FIG. 7. FIG. 7 illustrates exemplary coding of the diagnose (report) message according to an embodiment of the present invention.

S4: Diagnose (Submit)

The VMG may submit a list of software modules acquired from each ECU to the update server to check whether a software update is available for the vehicle. To this end, the diagnose (submit) message may be used.

Figure 8:
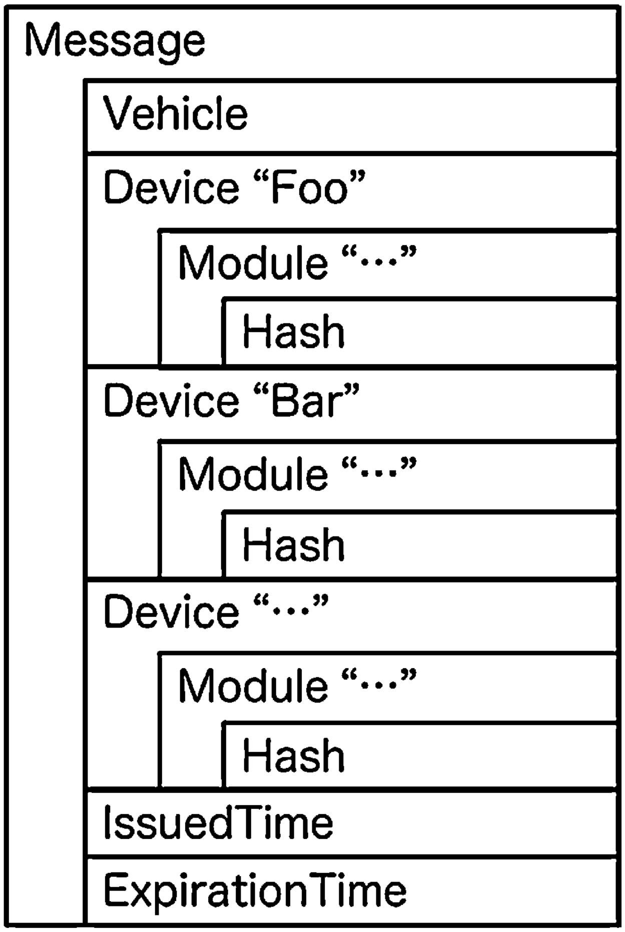
FIG. 8 illustrates an exemplary structure of a diagnose submit message according to an embodiment of the present invention.

The structure of the diagnose (submit) message is illustrated in FIG. 8. FIG. 8 illustrates an exemplary structure of the diagnose (submit) message according to an embodiment of the present invention.

Referring to FIG. 8, the structure of the diagnose (submit) message may be similar to the diagnose (report) message illustrated in FIG. 6. The diagnose (submit) message may further include a Vehicle element.

An example of the format of the diagnose submit message is shown below in Table 5.

TABLE 5

| Element | Attribute | Description |
|---|---|---|
| Message | — | Container of the message |
| | protocol | Always “1.0” |
| | version | The version number of the message sender |
| | type | Message type (always “diagnose”) |
| | subtype | Message subtype (always “submit”) |
| | sessionid | Session ID is a random GUID associated with the diagnose session. An identical session ID is applied to a set of diagnose request, report and submit messages. |
| | trustlevel | Trustlevel is determined based on security capability and safety requirement of device that generated this message. |
| | ownerid | Owner ID provided by a car manufacture/supplier. |
| | messageid | Message ID is a random GUID associated with individual message. |
| Vehicle | — | Container of vehicle information. It contains multiple Module elements. |
| | name | Name of the vehicle, if any. |
| | model | Type name of the vehicle provided by the car manufacture. |
| | modelid | Model name of the vehicle |
| | locale | Locale information of the vehicle |
| | modelyear | Year of the vehicle manufactured |
| | vehicleid | Vehicle id defined by a car manufacture/supplier. |
| Device | — | Container of device information. It contains multiple Module elements. |
| | name | Name of the device, if any. |
| | type | Type name of the device, such as “Power management ECU”, “Seat belt control ECU”, etc. |
| | model | Model name of the device. |
| | deviceid | Device id defined by a car manufacture/supplier. |
| Module | — | Container of module information, which contains a Hash element. |
| | moduleid | Module id is a unique id provided by a car manufacture/a supplier. |
| | version | Version of this software module. |
| | hwversion | Version of H/W including this software module |
| | nextversion | The version of the module update in progress, which is mainly used for sending response message during an update. |
| Hash | — | Hash is a container of a hash value and information of its hash algorithm. |
| | algorithm | Algorithm of the hash function (e.g., SHA-3, SHA-256, etc.) |
| IssuedTime | — | Time of generation of this message. |
| ExpirationTime | — | Expiration time of this message. |

Referring to Table 5, in the diagnose (submit) message, the type field of the Message element may always be set to “diagnose” and the subtype field may always be set to “submit”. As described above, the Vehicle element may include the locale field and may optionally further include a model year (modelyear) field that indicates the year of the vehicle manufactured.

Exemplary XML coding of this message is illustrated in FIG. 9. FIG. 9 illustrates exemplary coding of the diagnose (submit) message according to an embodiment of the present invention.

S5: Diagnose (Receipt)

The update server may transmit, to the VMG, a diagnose (receipt) message in confirmation of a receipt of the list submitted by the VMG. Thus, the VMG may recognize that submission of the list is successfully performed.

In this case, the update server may transmit this message to the VMG without checking an available update of each software module. Accordingly, this message may not include information as to whether an update of each software module is performed and, therefore, may not require the Vehicle, Device, and Module elements. For this reason, this message may have the format as illustrated in FIG. 4. Instead, this message may include, in the Message element, a status field indicating whether the diagnose submit message is successfully received. An example of the configuration of the Message element including the status field is shown below in Table 6.

TABLE 6

| Element | Attribute | Description |
|---|---|---|
| Message | — | Container of the message |
| | protocol | Always “1.0” |
| | version | The version number of the message sender |
| | type | Message type (always “diagnose”) |
| | subtype | Message subtype (always “receipt”) |
| | sessionid | Session ID is a random GUID associated with the diagnose session. An identical session ID is applied to a set of diagnose request, report and submit messages. |
| | trustlevel | Trustlevel is determined based on security capability and safety requirement of device that generated this message. |
| | ownerid | Owner ID provided by a car manufacture/supplier. |
| | messageid | Message ID is a random GUID associated with individual message. |
| | status | Acknowledgement of report for diagnose (submit) |

Referring to Table 6, in the diagnose (receipt) message, the type field of the message element may always be set to “diagnose” and the subtype field may always be set to “receipt”. In addition, the status field may be set to “yes” when the diagnose (submit) message is successfully received.

Exemplary XML coding of this message is illustrated in FIG. 10. FIG. 10 illustrates exemplary coding of the diagnose receipt message according to an embodiment of the present invention.

S6: Update Software Check of Update Server

Based on hardware and software information list included in the diagnose (submit) message, the update server may inspect the status of software installed in the vehicle and determine necessary updates for ECUs.

S7: Update_Check (Request)

Since the inspection of step S6 may prolong, the VMG may periodically check necessity of an update for the vehicle with respect to the update server. To this end, the update_check (request) message may be used.

Figure 11:
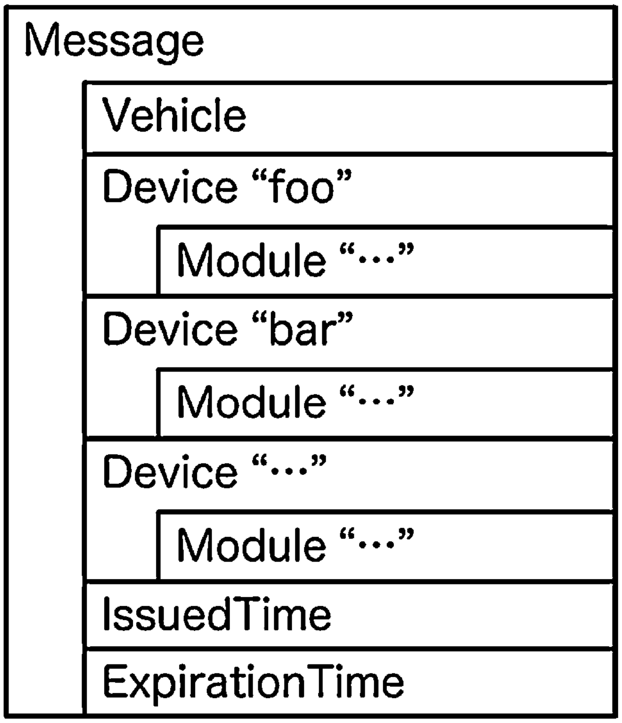
FIG. 11 illustrates an exemplary structure of an update check request message according to an embodiment of the present invention.

The structure of the update_check (request) message is illustrated in FIG. 11. FIG. 11 illustrates an exemplary structure of the update_check (request) message according to an embodiment of the present invention.

Referring to FIG. 11, the structure of the update_check (request) message may be similar to the structure of the diagnose (submit) message illustrated in FIG. 8. The Hash element of each module is omitted in FIG. 11.

An example of the format of the update_check (request) message is shown below in Table 7.

TABLE 7

| Element | Attribute | Description |
|---|---|---|
| Message | — | Container of the message |
| | protocol | Always “1.0” |
| | version | The version number of the message sender |
| | type | Message type (always “update_check”) |
| | subtype | Message subtype (always “request”) |
| | sessionid | Session ID is a random GUID associated with the update_check |

TABLE 7-continued

| Element | Attribute | Description |
|---|---|---|
| | | session. An identical session ID is applied to a set of update_check, request and report messages. |
| | trustlevel | Trustlevel is determined based on security capability and safety requirement of device that generated this message. |
| | ownerid | Owner ID provided by a car manufacture/supplier. |
| | messageid | Message ID is a random GUID associated with individual message. |
| Vehicle | — | Container of vehicle information. It contains multiple Module elements. |
| | name | Name of the vehicle, if any. |
| | model | Type name of the vehicle provided by the car manufacture. |
| | modelid | Model name of the vehicle |
| | locale | Locale information of the vehicle |
| | modelyear | Year of the vehicle manufactured |
| | vehicleid | Vehicle id defined by a car manufacture/supplier. |
| Device | — | Container of device information. It contains multiple Module elements. |
| | name | Name of the device, if any. |
| | type | Type name of the device, such as "Power management ECU", "Seat belt control ECU", etc. |
| | model | Model name of the device. |
| | deviceid | Device id defined by a car manufacture/supplier. |
| Module | — | Container of module information, which contains a Hash element. |
| | moduleid | Module id is a unique id provided by a car manufacture/a supplier. |
| | version | Version of this software module. |
| | hwversion | Version of H/W including this software module |
| | nextversion | The version of the module update in progress, which is mainly used for sending response message during an update. |
| IssuedTime | — | Time of generation of this message. |
| ExpirationTime | — | Expiration time of this message. |

Referring to Table 7, in the update_check (request) message, the type field of the Message element may always be set to "update_check" and the subtype field may always be set to "request". The sessionid field of the Message element may be set to a random GUID associated with an update check session. An identical value may be applied to a set of the update_check (request) and update_check (response) messages, which correspond to one update check session.

As described above, the hwversion field of the Module element may be included in the Device element instead of the Module element.

An example of XML coding of this message is illustrated in FIG. 12. FIG. 12 illustrates exemplary coding of the update_check (request) message according to an embodiment of the present invention.

S8: Update_Check (Response)

If any update is available, the update server may transmit download location information (e.g., uniform resource locator (URL)) of an update module to the VMG. To this end, the update_check (response) message may be used.

Figure 13:
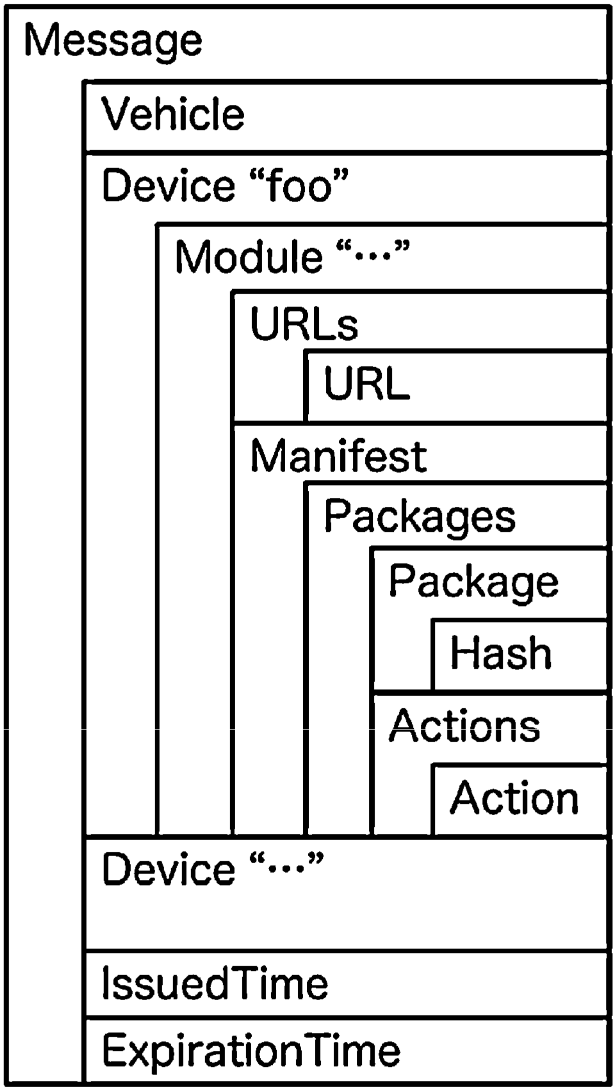
FIG. 13 illustrates an exemplary structure of an update check response message according to an embodiment of the present invention.

The structure of the update_check (response) message is illustrated in FIG. 13. FIG. 13 illustrates an exemplary structure of the update_check (response) message according to an embodiment of the present invention.

Referring to FIG. 13, a basic structure of the update_check (response) message may be similar to the above-described update_check (request) message illustrated in FIG. 11 and a URLs element and a Manifest element may be included as lower elements of the Module element.

An example of the format of the update_check (response) is shown below in Table 8.

TABLE 8

| Element | Attribute | Description |
|---|---|---|
| Message | — | Container of the message |
| | protocol | Always "1.0" |
| | version | The version number of the message sender |
| | type | Message type (always "update_check") |
| | subtype | Message subtype (always "response") |
| | sessionid | Session ID is a random GUID associated with the update_check session. An identical session ID is applied to a set of update_check request, report and submit messages. |
| | trustlevel | Trustlevel is determined based on security capability and safety requirement of device that generated this message. |
| | ownerid | Owner ID provided by a car manufacture/supplier. |
| | messageid | Message ID is a random GUID associated with individual message. |
| Vehicle | — | Container of vehicle information. It contains multiple Module elements. |
| | name | Name of the vehicle, if any. |
| | model | Type name of the vehicle provided by the car manufacture. |
| | modelid | Model name of the vehicle |
| | locale | Locale information of the vehicle |
| | modelyear | Year of the vehicle manufactured |
| | vehicleid | Vehicle id defined by a car manufacture/supplier. |

TABLE 8-continued

| Element | Attribute | Description |
|---|---|---|
| Device | — | Container of device information. It contains multiple Module elements. |
| | name | Name of the device, if any. |
| | type | Type name of the device, such as "Power management ECU", "Seat belt control ECU", etc. |
| | model | Model name of the device. |
| | deviceid | Device id defined by a car manufacture/supplier. |
| Module | — | Container of module information, which contains a Hash element. |
| | moduleid | Module id is a unique id provided by a car manufacture/a supplier. |
| | version | Version of this software module. |
| | hwversion | Version of H/W including this software module |
| | nextversion | The version of the module update in progress, which is mainly used for sending response message during an update. |
| | status | Status of the inspection of update. "noupdate" is set if there are no updates, while "ok" is set if there are any update for this module. |
| URLs | — | Container of URL elements if there are any updates. This element is contained in a Module element where its status is ok. |
| URL | — | URL of update file. |
| | codebase | Location of the update file. |
| | codebase2 | Backup location of the update file. |
| Manifest | — | Describes the module needed to be installed, and the actions needed to be taken with those files. |
| | version | Specific newer version number of this software module. |
| Packages | — | A set of files needed to be installed. Contains no attribution. Contains one or more Package child elements. |
| Package | — | A single file to be installed for the module. |
| | name | Describes the filename of the update module. |
| | size | Contains the size in bytes of the update module. |
| Hash | — | Container of a hash value and information of its hash algorithm. |
| | algorithm | Algorithm of the hash function (e.g., SHA-3, SHA-256, etc.) |
| Actions | — | Actions to be performed to install the module once all required files in the packages element have been successfully downloaded. |
| Action | — | A single action to perform as part of the install process |
| | event | A fixed string denoting when this action should be run. One of "preinstall", "install", "postinstall" and "update". |
| | arguments | Arguments to be passed to the installation process. |
| IssuedTime | — | Time of generation of this message. |
| ExpirationTime | — | Expiration time of this message. |

Referring to Table 8, in the update check request message, the type field of the Message element may always be set to "update_check" and the subtype field may always be set to "response".

The module element may include a status field. The status field may be set to "noupdate" when no updates are available as a result of update inspection and may be set to "ok" when any updates are available for a corresponding module.

Meanwhile, the URLs element may indicate an address of an update file as a lower element of the Module element when any update is available. An actual address may be included in a codebase field of the URL element which is a lower element of the URLs element. If two addresses of an update file for a corresponding module are prepared, one URL element may include two codebase fields, or one codebase field and one codebase2 field may be used. This will be described later in more detail.

The Manifest element may describe a module to be installed and actions needed to be taken with respect to files and include a version field indicating a specific newer version number of a corresponding software module. The Manifest element may include, as a lower element, a Packages element that indicates information about a set of files to be installed. The Packages element may include, as a lower element, a Package element and an Actions element.

The Package element may indicate information about a signal file to be installed for the module. The Package element may include a name field that indicates a filename and a size field that indicates the size of a file in bytes. The Package element may include a Hash element as a lower element.

The Actions element may indicate information about actions to be performed to install the module once all required files in the Packages element have been successfully downloaded and may include an Action element as a lower element. The Action element may indicate information about an individual action to be performed as part of an installation process. The Action element may include an event field that indicates one of 4 preset actions and an arguments field that indicates arguments to be passed to the install process.

An example of XML coding of this message is illustrated in FIG. 14. FIG. 14 illustrates exemplary coding of the update_check (response) message according to an embodiment of the present invention.

Meanwhile, the update_check (request) and update_check (response) messages may be exchanged several times while update inspection of the update server is performed. In this process, a file may be exposed to playback attacks. Accordingly, it may be desirable to guarantee an exact match between the update_check (request) message and the update_check (response) message. To this end, according to an exemplary embodiment, a Nonce element may be applied to this message.

An example of the format of the update_check (response) message to which the Nonce element is applied is shown below in Table 9.

TABLE 9

| Element | Attribute in Element | Description |
|---|---|---|
| Message | — | Container of the message |
| | protocol | Always "1.0" |
| | version | The version number of the message sender |
| | type | Message type (always "update_check") |
| | subtype | Message subtype (always "request") |
| | sessionid | Session ID is a random GUID associated with the update_check session. An identical session ID is applied to a set of update_check, request and report messages. |
| | trustlevel | Trustlevel is determined based on security capability and safety requirement of device that generated this message. |
| | ownerid | Owner ID provided by a car manufacture/supplier. |
| | messageid | Message ID is a random GUID associated with individual message. |
| . . . | . . . | . . . |
| IssuedTime | — | Time of generation of this message. |
| ExpirationTime | — | Expiration time of this message. |
| Nonce | | Random generated code for nonce method |

Referring to Table 9, the update_check (response) message may include the Nonce element that indicates a randomly generated code for a nonce scheme.

As described above, the update_check (response) message may include URL link information that the VMG can download an update software module. However, the VMG may not be able to access the update server or the address. For example, the inaccessible situation may be generated 1) when the update server is temporarily or permanently down for reasons such as denial-of-service (DoS) attack or a hardware problem (e.g., network interface card (NIC) or disk failure), 2) a validation problem of the update software module occurs due to file corruption such as virus infection, or 3) the update server is subjected to excessive traffic due to simultaneous connection of multiple users.

Accordingly, to provide a robust software download environment, a backup URL link address may be provided through the update_check (response) message. To this end, a method of providing backup URL information using one of the two codebase fields and a method of providing the backup URL information using the codebase2 field may be considered, as described above. The respective methods are illustrated in FIG. 15 and FIG. 16.

FIG. 15 illustrates exemplary coding of the update_check (response) message that provides a backup address through the codebase field according to an embodiment of the present invention. FIG. 16 illustrates exemplary coding of the update_check (response) message that provides the backup address through the codebase2 field according to an embodiment of the present invention.

Referring to FIG. 15, two URL elements may be present as a lower element of the URLs element. Each URL element may include one codebase field. The codebase field of the first URL element may include default URL address information and the codebase field of the second URL element may include backup URL address information.

Next, referring to FIG. 16, the URLs element may include one URL element which includes the codebase field and the codebase2 field. The codebase field may include the default URL address information and the codebase2 field may include the backup URL address information.

The backup URL information may be an address of another folder of the same server or an address of another server. When the backup URL information is the address of another folder of the same server, the VMG may cope with file corruption or disk failure. When the backup URL information is the address of another server, the VMG may cope with traffic jam or connection failure of an original server.

S9: Download Update S/W

If any update is available, the VMG may access download location (URL/backup URL) information to download an update module.

S10: Update (Notification)

Before applying an update to each ECU, the VMG may notify a driver through a user interface to confirm application of the update (S10). For this purpose, the update (notification) message may be used.

The element structure of the update_check (request) message may be similar to the structure of the update_check (response) message illustrated in FIG. 13. However, since a normal driver may desire a brief description of update software, information about the update software may be included in this message so that a description of the update software may be output through the user interface.

An example of the format of the update (notification) message is shown below in Table 10.

TABLE 10

| Element | Attribute | Description |
|---|---|---|
| Message | — | Container of the message |
| | protocol | Always "1.0" |
| | version | The version number of the message sender |
| | type | Message type (always "update") |
| | subtype | Message subtype (always "notification") |
| | sessionid | Session ID is a random GUID associated with the update session. An identical session ID is applied to a set of update notification, confirmation, application and result messages. |
| | trustlevel | Trustlevel is determined based on security capability and safety requirement of device that generated this message. |

TABLE 10-continued

| Element | Attribute | Description |
|---|---|---|
| | ownerid | Owner ID provided by a car manufacture/supplier. |
| | messageid | Message ID is a random GUID associated with individual message. |
| Device | — | Container of device information. It contains multiple Module elements. |
| | name | Name of the device, if any. |
| | type | Type name of the device, such as “Power management ECU”, “Seat belt control ECU”, etc. |
| | model | Model name of the device. |
| | deviceid | Device id defined by a car manufacture/supplier. |
| Module | — | Container of module information, which contains a Hash element. |
| | moduleid | Module id is a unique id provided by a car manufacture/a supplier. |
| | version | Version of this software module. |
| | hwversion | Version of H/W including this software module |
| | nextversion | The version of the module update in progress, which is mainly used for sending response message during an update. |
| | status | Status of the inspection of update. Always “ok” is set. |
| URLs | — | Container of URL elements if there are any updates. This element is contained in a Module element where its status is ok. |
| URL | — | URL of update file. |
| | codebase | Location of the update file. |
| | codebase2 | Backup location of the update file. |
| Manifest | — | Describes the module needed to be installed, and the actions needed to be taken with those files. |
| | version | Specific newer version number of this software module. |
| Packages | — | A set of files needed to be installed. Contains no attribution. Contains one or more Package child elements. |
| Package | — | A single file to be installed for the module. |
| | name | Describes the filename of the update module. |
| | description | Description of update module |
| | size | Contains the size in bytes of the update module. |
| Hash | — | Container of a hash value and information of its hash algorithm. |
| | algorithm | Algorithm of the hash function (e.g., SHA-3, SHA-256, etc.) |
| Actions | — | Actions to be performed to install the module once all required files in the packages element have been successfully downloaded. |
| Action | — | A single action to perform as part of the install process |
| | event | A fixed string denoting when this action should be run. One of “preinstall”, “install”, “postinstall” and “update”. |
| | arguments | Arguments to be passed to the installation process. |
| IssuedTime | — | Time of generation of this message. |
| ExpirationTime | — | Expiration time of this message. |

Referring to Table 10, in the update (notification) message, the type field of the Message element may always be set to “update” and the subtype field may always be set to “notification”.

A session ID field may be set to a random GUID associated with an update session. An identical value may be applied to a set of an update notification, update confirmation, update application, and update result messages that correspond to one update session.

Meanwhile a Package element may include a description field that indicate a description of an update module.

An example of XML coding of this message is illustrated in FIG. 17. FIG. 17 illustrates exemplary coding of the update (notification) message according to an embodiment of the present invention. Referring to FIG. 17, the description field may include text information for describing the software module.

According to another exemplary embodiment, the description field may include a URL that includes corresponding information instead of the text information. In this case, the Package element may include a description URL (descriptionurl) field, instead of the description field, as shown below in Table 11.

TABLE 11

| | | |
|---|---|---|
| Packages | — | A set of files needed to be installed. Contains no attribution. Contains one or more Package child elements. |
| Package | — | A single file to be installed for the module. |
| | name | Describes the filename of the update module. |
| | size | Contains the size in bytes of the update module. |
| | descriptionurl | Location of update description (text or html file) |

An example of XML coding of the message shown in Table 11 is illustrated in FIG. 18. FIG. 18 illustrates another exemplary coding of the update (notification) message according to an embodiment of the present invention.

S11: Update (Confirmation)

If the driver confirms and accepts application of an update, the update (confirmation) may be transmitted to the VMG.

The structure of the update (confirmation) message may be similar to the structure of the diagnose (request) message illustrated in FIG. 4. An example of the format of the update (confirmation) message is shown below in Table 12.

TABLE 12

| Element | Attribute | Description |
|---|---|---|
| Message | — | Container of the message |
| | protocol | Always "1.0" |
| | version | The version number of the message sender |
| | type | Message type (always "update") |
| | subtype | Message subtype (always "confirmation") |
| | sessionid | Session ID is a random GUID associated with the update session. An identical session ID is applied to a set of update notification, confirmation, application and result messages. |
| | trustlevel | Trustlevel is determined based on security capability and safety requirement of device that generated this message. |
| | ownerid | Owner ID provided by a car manufacture/supplier. |
| | messageid | Message ID is a random GUID associated with individual message. |
| | status | A driver's preference of application of the updates. "ok" or "no" is set. |
| IssuedTime | — | Time of generation of this message. |
| ExpirationTime | | Expiration time of this message. |

Referring to Table 12, in the update (confirmation) message, the type field of the Message element may always be set to "update" and the subtype field may always be set to "confirmation".

The Message element may include a status field that indicates whether application of updates is accepted. The status field may be set to "yes" or "ok" if the driver accepts application of the updates and may be set to "no" if not.

An example of XML coding of this message is illustrated in FIG. 19. FIG. 19 illustrates exemplary coding of an update (confirmation) message according to an embodiment of the present invention.

S12: Update (Application)

According to acceptance of the driver, the VMG may transmit an update module file to the ECU and request that the ECU apply updates. For this purpose, the update (application) message may be used.

Figure 20:
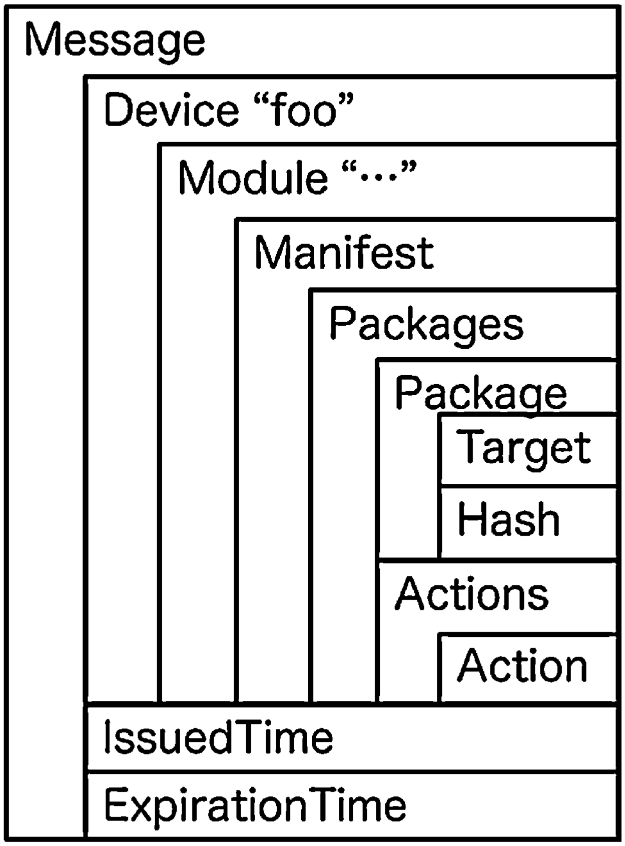
FIG. 20 illustrates an exemplary structure of an update application message according to an embodiment of the present invention.

The structure of the update application (message) is illustrated in FIG. 20. FIG. 20 illustrates an exemplary structure of the update (application) message according to an embodiment of the present invention.

Referring to FIG. 20, since the update application message is transmitted from the VMG to an individual ECU, the update (application) message may include no Vehicle element and may include a Device element that corresponds to the ECU. The update (application) message may include a Module element as a lower element. The Module element may include a Manifest element which includes a Packages element.

An example of the format of the update (application) message is shown below in Table 13.

TABLE 13

| Element | Attribute | Description |
|---|---|---|
| Message | — | Container of the message |
| | protocol | Always "1.0" |
| | version | The version number of the message sender |
| | type | Message type (always "update") |
| | subtype | Message subtype (always "application") |
| | sessionid | Session ID is a random GUID associated with the update session. An identical session ID is applied to a set of update notification, confirmation, application and result messages. |
| | trustlevel | Trustlevel is determined based on security capability and safety requirement of device that generated this message. |
| | ownerid | Owner ID provided by a car manufacture/supplier. |
| | messageid | Message ID is a random GUID associated with individual message. |
| Device | — | Container of device information. It contains multiple Module elements. |
| | name | Name of the device, if any. |
| | type | Type name of the device, such as "Power management ECU", "Seat belt control ECU", etc. |
| | model | Model name of the device. |
| | deviceid | Device id defined by a car manufacture/supplier. |
| Module | — | Container of module information, which contains a Hash element. |
| | moduleid | Module id is a unique id provided by a car manufacture/a supplier. |
| | version | Version of this software module. |
| | hwversion | Version of H/W including this software module |
| | nextversion | The version of the module update in progress, which is mainly used for sending response message during an update. |
| Manifest | — | Describes the module needed to be installed, and the actions needed to be taken with those files. |
| | version | Specific newer version number of this software module. |
| Packages | — | A set of files needed to be installed. Contains no attribution. Contains one or more Package child elements. |

TABLE 13-continued

| Element | Attribute | Description |
|---|---|---|
| Package | — | A single file to be installed for the module. |
| | name | Describes the filename of the update module. |
| | size | Contains the size in bytes of the update module. |
| Target | — | Encoded binary data as an update module. |
| | encode | Specification of encodings (“base64Binary” or “hexBinary”) |
| Hash | — | Container of a hash value and information of its hash algorithm. |
| | algorithm | Algorithm of the hash function (e.g., SHA-3, SHA-256, etc.) |
| Actions | — | Actions to be performed to install the module once all required files in the packages element have been successfully downloaded. |
| Action | — | A single action to perform as part of the install process |
| | event | A fixed string denoting when this action should be run. One of “preinstall”, “install”, “postinstall” and “update” |
| | arguments | Arguments to be passed to the installation process. |
| IssuedTime | — | Time of generation of this message. |
| ExpirationTime | — | Expiration time of this message. |

Referring to Table 13, in the update (application) message, the type field of the Message element may always be set to “update” and the subtype field may always be set to “application”.

Meanwhile, the Package element may include a Target element that indicates an update module as encoded binary data. An encoding scheme may be indicated through an encode field.

An example of XML coding of this message is illustrated in FIG. 21. FIG. 21 illustrates exemplary coding of the update (application) message according to an embodiment of the present invention.

Referring to FIG. 22, since the update (result) message is transmitted from the ECU to the VMG, the update (result) message may include no Vehicle element and may indicate a Device element that corresponds to the ECU. The update (result) message may include a Module element as a lower element.

An example of the format of the update (result) message is shown below in Table 14.

TABLE 14

| Element | Attribute in Element | Description |
|---|---|---|
| Message | — | Container of the message |
| | protocol | Always “1.0” |
| | version | The version number of the message sender |
| | type | Message type (always “update”) |
| | subtype | Message subtype (always “result”) |
| | sessionid | Session ID is a random GUID associated with the update session. An identical session ID is applied to a set of diagnose request, report and submit messages. |
| | trustlevel | Trustlevel is determined based on security capability and safety requirement of device that generated this message. |
| | ownerid | Owner ID provided by a car manufacture/supplier. |
| | messageid | Message ID is a random GUID associated with individual message. |
| Device | — | Container of device information. It contains multiple Module elements. |
| | name | Name of the device, if any. |
| | type | Type name of the device, such as “Power management ECU”, “Seat belt control ECU”, etc. |
| | model | Model name of the device. |
| | deviceid | Device id defined by a car manufacture/supplier. |
| Module | — | Container of module information, which contains a Hash element. |
| | moduleid | Module id is a unique id provided by a car manufacture/a supplier. |
| | version | Version of this software module. |
| | hwversion | Version of H/W including this software module |
| | nextversion | The version of the module update in progress, which is mainly used for sending response message during an update. |
| | status | Result of update process in the ECU. |
| IssuedTime | — | Time of generation of this message. |
| ExpirationTime | — | Expiration time of this message. |

S13: Update (Result)

Upon receiving an update module file, each ECU may apply updates and report the application result to the VMG. For this purpose, the update (result) message may be used.

The structure of the update (result) message is illustrated in FIG. 22. FIG. 22 illustrates an exemplary structure of the update (result) message according to an embodiment of the present invention.

Referring to Table 14, in the update (result) message, the type field of the Message element may always be set to “update” and the subtype field may always be set to “result”.

Meanwhile, a Package element may include a Target element that indicates an update module as encoded binary data. An encoding scheme may be indicated through an encode field.

An example of XML coding of this message is illustrated in FIG. 23. FIG. 23 illustrates exemplary coding of the update (result) message according to an embodiment of the present invention.

S14: Update_Report (Submit)

The VMG may submit a report of an update application result to the update server through the update_report (submit) message.

The structure of the update_report (submit) message may be similar to the structure of the diagnose (submit) message illustrated in FIG. 8. An example of the format of the update_report (submit) message is shown below in Table 15.

TABLE 15

| Element | Attribute in Element | Description |
|---|---|---|
| Message | — | Container of the message |
| | protocol | Always "1.0" |
| | version | The version number of the message sender |
| | type | Message type (always "update report") |
| | subtype | Message subtype (always "submit") |
| | sessionid | Session ID is a random GUID associated with the update__report session. An identical session ID is applied to a set of update__report submit and receipt messages. |
| | trustlevel | Trustlevel is determined based on security capability and safety requirement of device that generated this message. |
| | ownerid | Owner ID provided by a car manufacture/supplier. |
| | messageid | Message ID is a random GUID associated with individual message. |
| Vehicle | — | Container of vehicle information. It contains multiple Module elements. |
| | name | Name of the vehicle, if any. |
| | model | Type name of the Vehicle provided by the car manufacture. |
| | modelid | Model name of the vehicle |
| | locale | Locale information of the vehicle |
| | modelyear | Year of the vehicle manufactured |
| | vehicleid | Vehicle id defined by a car manufacture/supplier. |
| Device | — | Container of device information. It contains multiple Module elements. |
| | name | Name of the device, if any. |
| | type | Type name of the device, such as "Power management ECU", "Seat belt control ECU", etc. |
| | model | Model name of the device. |
| | deviceid | Device id defined by a car manufacture/supplier. |
| Module | — | Container of module information, which contains a Hash element. |
| | moduleid | Module id is a unique id provided by a car manufacture/a supplier. |
| | version | Version of this software module. |
| | hwversion | Version of H/W including this software module |
| | nextversion | The version of the module update in progress, which is mainly used for sending response message during an update. |
| | status | Result of application of this module. |
| Hash | — | Hash is a container of a hash value and information of its hash algorithm. |
| | algorithm | Algorithm of the hash function (e.g., SHA-3, SHA-256, etc.) |
| IssuedTime | — | Time of generation of this message. |
| ExpirationTime | — | Expiration time of this message. |

Referring to Table 15, in the update_report (submit) message, the type field of the Message element may always be set to "update_report" and the subtype field may always be set to "submit".

A Module element of the update_report (submit) message may include a status field and the result of application of updates of a corresponding module may be indicated through this status field.

An example of XML coding of this message is illustrated in FIG. 24. FIG. 24 illustrates exemplary coding of an update report submit message according to an embodiment of the present invention.

S15: Update_Report (Receipt)

The update server may transmit the update_report (receipt) message to the VMG in response to the update_report (submit) message.

The structure of the update_report (receipt) message may be similar to the structure of the update_check (request) message illustrated in FIG. 11. An example of the format of the update_report (receipt) message is shown below in Table 16.

TABLE 16

| Element | Attribute | Description |
|---|---|---|
| Message | — | Container of the message |
| | protocol | Always "1.0" |
| | version | The version number of the message sender |
| | type | Message type (always "update__report") |
| | subtype | Message subtype (always "receipt") |

TABLE 16-continued

| Element | Attribute | Description |
|---|---|---|
| | sessionid | Session ID is a random GUID associated with the update_report session. An identical session ID is applied to a set of update_report submit and receipt messages. |
| | trustlevel | Trustlevel is determined based on security capability and safety requirement of device that generated this message. |
| | ownerid | Owner ID provided by a car manufacture/supplier. |
| | messageid | Message ID is a random GUID associated with individual message. |
| Vehicle | — | Container of vehicle information. It contains multiple Module elements. |
| | name | Name of the vehicle, if any. |
| | model | Type name of the vehicle provided by the car manufacture. |
| | modelid | Model name of the vehicle |
| | locale | Locale information of the vehicle |
| | modelyear | Year of the vehicle manufactured |
| | vehicleid | Vehicle id defined by a car manufacture/supplier. |
| Device | — | Container of device information. It contains multiple Module elements. |
| | name | Name of the device, if any. |
| | type | Type name of the device, such as "Power management ECU", "Seat belt control ECU", etc. |
| | model | Model name of the device. |
| | deviceid | Device id defined by a car manufacture/supplier. |
| Module | — | Container of module information, which contains a Hash element. |
| | moduleid | Module id is a unique id provided by a car manufacture/a supplier. |
| | version | Version of this software module. |
| | hwversion | Version of H/W including this software module |
| | nextversion | The version of the module update in progress, which is mainly used for sending response message during an update. |
| | status | Acknowledgement of report for this module. |
| IssuedTime | — | Time of generation of this message. |
| ExpirationTime | — | Expiration time of this message. |

Referring to Table 16, in the update_report (receipt) message, the type field of the Message element may always be set to "update_report" and the subtype field may always be set to "receipt".

A Module element of the update_report (receipt) message may include a status field which may indicate whether report acknowledgement (ACK) of a corresponding module is made.

An example of XML coding of this message is illustrated in FIG. 25. FIG. 25 illustrates exemplary coding of an update_report (receipt) message according to an embodiment of the present invention.

Meanwhile, the VMG according to this exemplary embodiment may include at least a wired communication module, a wireless communication module, a memory, and a processor (not illustrated).

The wired communication module may be connected to the VMG and provide a communication function with ECUs for performing a diagnose session and an update session. Wired communication may conform to at least one scheme of a controller area network (CAN), Ethernet, or a local interconnect network (LIN) protocol but embodiments are not limited thereto.

The wireless communication module may provide a wireless communication function with the update server and may be connected to the update server via a wireless base station or a telematics center.

The memory may store program instructions for processing and controlling the processor and serve to temporarily store input/output data.

The processor may control an overall operation of elements of the VMG. For example, the processor may perform control, message generation, message interpretation, authentication, and encryption functions, for performing the above-described exemplary embodiments of the present invention, for example, steps S2 to S14.

The vehicle according to the embodiments may include the above-described VMG and at least one ECU connected to the VMG.

The present invention may be implemented as computer-readable code that may be written on a computer-readable medium in which a program is recorded. The computer-readable medium may be any type of recording device in which data that can be read by a computer system is stored. Examples of the computer-readable medium include a hard disk drive (HDD), a solid state drive (SSD), a silicon disk drive (SDD), a ROM, a RAM, a CD-ROM, a magnetic tape, a floppy disk, and an optical data storage.

It will be apparent to those skilled in the art that various modifications and variations may be made in the present invention without departing from the spirit or scope of the invention. Thus, the present invention is intended to cover the modifications and variations of this invention within the scope of the appended claims and their equivalents.

According to at least one exemplary embodiment of the present invention, a procedure of wirelessly updating software of an ECU in a vehicle may be defined. The defined procedure may be applied to an in-vehicle VMG, various ECUs connected to the VMG, and an update software server. Particularly, the procedure of wirelessly updating software and formats of messages that are used in each step in the procedure may be defined. Since hardware version information of a software module and locale information of the vehicle are included in a related message, more accurate update may be performed.

The invention claimed is:

1. A method performed by an update server for wirelessly updating software for a vehicle, the method comprising:

receiving, from the vehicle, a diagnose submit message which includes a software module list indicating one or more software modules which are currently installed in each of at least one controller in the vehicle, wherein the diagnose submit message includes hardware version information for each of the at least one controller and locale information of a vehicle, and wherein the hardware version information and the locale information are used for determining whether there exists, for each of the at least one controller, at least one update module which corresponds to the hardware version information and the locale information; and;

transmitting, to the vehicle, an update check response message which includes at least one of download location information of the at least one update module or an actions element, wherein the download location information includes two or more uniform resource location (URL) addresses at least one of which is a backup URL address, and wherein the actions element indicates information about actions to be performed to install the at least one update module once the at least one update module have been successfully downloaded.

2. The method of claim 1, wherein the hardware version information is included in a Device element of the diagnose submit message.

3. The method of claim 1, wherein the locale information of the vehicle is included in a Vehicle element of the diagnose submit message.

4. The method of claim 1, further comprising transmitting, to the vehicle, a diagnose receipt message that indicates whether the diagnose submit message is successfully received.

5. The method of claim 4, wherein each of the diagnose submit message and the diagnose receipt message includes session identifier (sessionid) information and has an identical value as the session identifier information.

6. The method of claim 1, wherein the actions element includes an event field indicating when to perform each of the actions.

7. An in-vehicle gateway for wirelessly updating software, the in-vehicle gateway comprising:

a wired communication module configured to communicate with at least one controller;

a wireless communication module configured to communicate with an update server; and a processor configured to perform control to obtain a software module list for each of the at least one controller, the software module list indicating one or more software modules which are currently installed in each of the at least one controller, transmit, to an update server, a diagnose submit message including a software module list for each of the at least one controller, for checking whether updates of the software modules are needed, wherein the diagnose submit message includes hardware version information for each of the at least one controller, and locale information of a vehicle, and wherein the hardware version information and the locale information are used for determining whether there exists, for each of the at least one controller, at least one update module which corresponds to the hardware version information and the locale information, receive, from the update server, an update check response message which includes at least one of download location information of the at least one update module or an actions element, wherein the download location information includes two or more uniform resource location (URL) addresses at least one of which is a backup URL address, and the actions element indicates information about actions to be performed to install the at least one update module once the at least one update module have been successfully downloaded, and download the at least one update module using the download location information, and perform an update process to install the at least one update module into an associated controller.

8. The in-vehicle gateway of claim 7, wherein the hardware version information is included in a Device element of the diagnose submit message.

9. The in-vehicle gateway of claim 7, wherein the locale information of the vehicle is included in a Vehicle element of the diagnose submit message.

10. The in-vehicle gateway of claim 7, wherein the processor performs control to receive a diagnose receipt message that indicates whether the diagnose submit message is successfully received from the update server through the wireless communication module.

11. The in-vehicle gateway of claim 10, wherein each of the diagnose submit message and the diagnose receipt message includes session identifier (sessionid) information and has an identical value as the session identifier information.

12. The in-vehicle gateway of claim 7, wherein the processor is configured to perform the update process by notifying a user of information on the at least one updated module through a user interface, and transmitting, in response to user confirmation, the at least one updated module to the associated controller.

13. The in-vehicle gateway of claim 7, wherein the actions element includes an event field indicating when to perform each of the actions.

14. The in-vehicle gateway of claim 7, wherein the at least one update module is installed based on the actions indicated by the actions element.

15. A method of wirelessly updating software at an in-vehicle gateway, the method comprising:

obtaining a software module list for each of at least one controller, the software module list indicating one or more software modules which are currently installed in each of the at least one controller;

transmitting, to an update server, a diagnose submit message including the software module list for each of the at least one controller, for checking whether updates of the software modules are needed, wherein the diagnose submit message includes hardware version information for each of the at least one controller and locale information of a vehicle, and wherein the hardware version information and the locale information are used for determining whether there exists, for each of the at least one controller, at least one update module which corresponds to the hardware version information and the locale information;

receiving, from the update server, an update check response message which includes at least one of download location information of the at least one update module or an actions element, wherein the download location information includes two or more uniform resource location (URL) addresses at least one of which is a backup URL address, and wherein the actions element indicates information about actions to be performed to install the at least one update module once the at least one update module have been successfully downloaded; and downloading the at least one update module using the download location information, and perform an update process to install the at least one update module into an associated controller.

16. The method of claim 15, wherein the update process comprises:

notifying a user of information on the at least one updated module through a user interface, and transmitting, in response to user confirmation, the at least one updated module to the associated controller.

17. The method of claim 15 wherein the actions element includes an event field indicating when to perform each of the actions.

18. The method of claim 15, wherein the at least one update module is installed based on the actions indicated by the actions element.

* * * * *